United States Patent [19]
Knothe et al.

[11] 3,860,802
[45] Jan. 14, 1975

[54] METHOD AND APPARATUS FOR ASCERTAINING A STEADY STATE VALUE OF A CONTINUOUSLY VARIABLE MEASURED QUANTITY

[75] Inventors: Erich Emil Karl Knothe, Gottingen-Geismar; Franz-Josef Melcher, Gottingen-Nikolausberg, both of Germany

[73] Assignee: Sartorius-Werke GmbH, Gottingen, Germany

[22] Filed: Oct. 11, 1973

[21] Appl. No.: 405,506

[30] Foreign Application Priority Data
Oct. 17, 1972 Germany............................ 2250793

[52] U.S. Cl............... 235/151.33, 177/25, 177/210, 177/DIG. 3, 235/92 WT
[51] Int. Cl. ..................... G01g 9/00, G05b 5/01
[58] Field of Search .......... 177/12, 210, DIG. 3, 25; 235/150.4, 151.3, 151.33, 151, 152, 92 WT, 235/92 CA, 177; 307/128; 340/146.2

[56] References Cited
UNITED STATES PATENTS
| 3,674,097 | 7/1972 | Gile ............................... 177/210 X |
| 3,789,937 | 2/1974 | Strobel et al. ....................... 177/210 |

*Primary Examiner*—Eugene G. Botz
*Assistant Examiner*—R. Stephen Dildine, Jr.
*Attorney, Agent, or Firm*—Edmund M. Jaskiewicz

[57] ABSTRACT

Method and apparatus for ascertaining a steady state value of a continuously variable measured quantity, for example, by comparing three consecutive sample values (A,B,C) of which one is reported if two each differ by less than a prescribed difference, and repeating the comparison, if necessary, with fresh sample values until the difference condition is satisfied.

7 Claims, 1 Drawing Figure

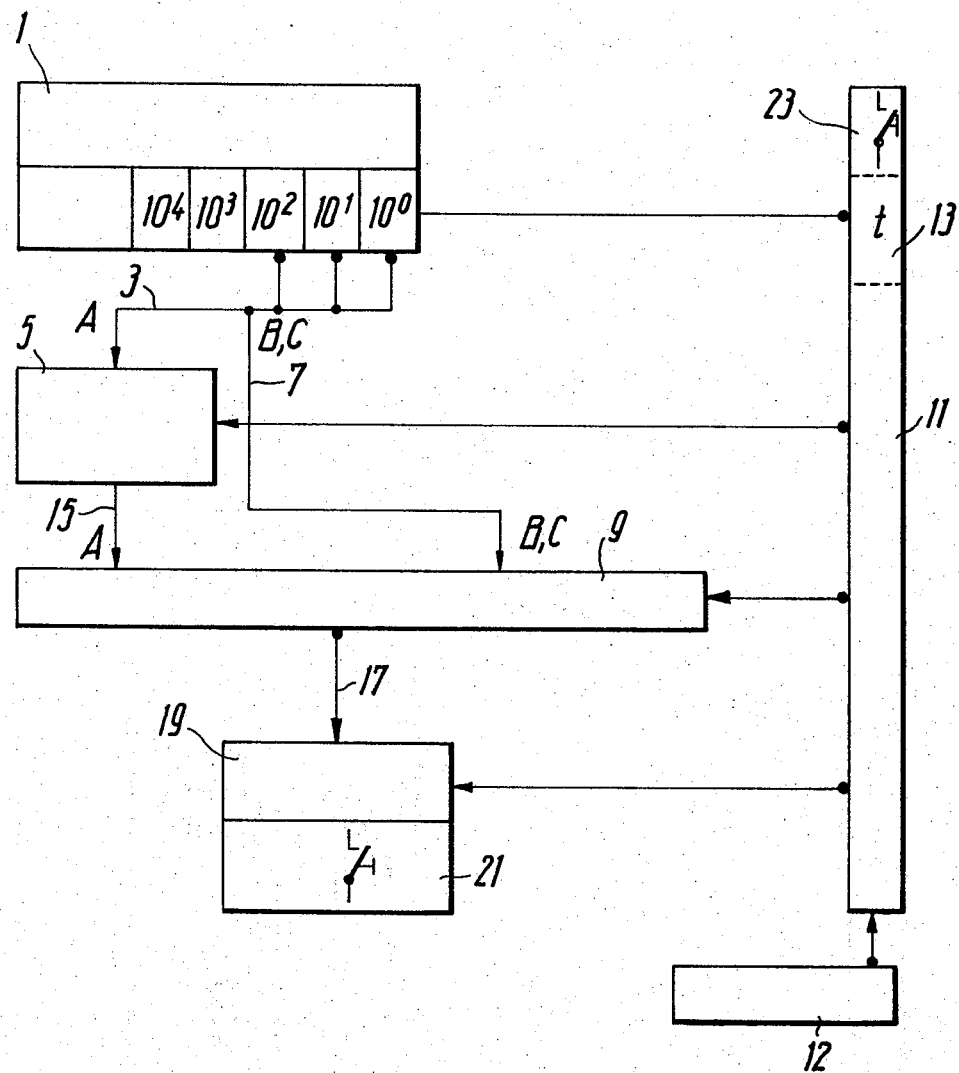

METHOD AND APPARATUS FOR ASCERTAINING A STEADY STATE VALUE OF A CONTINUOUSLY VARIABLE MEASURED QUANTITY

BACKGROUND OF THE INVENTION

The invention relates to an arrangement for and a method of digitally verifying steady state conditions, which is to say to ascertain when a quantity which is continuously monitored and reported by a measuring instrument attains a steady value after having undergone an abrupt change.

The expression "reported" in the present context is intended to mean the display of the measured quantity and/or its transmission to some other instrument which may be a controller or electronic data processing equipment.

A method of digitally reporting steady conditions has already been described in connection with weighing machines, in which the measured value is not reported until a fixed adjustable time of delay has elapsed after an abrupt change of load. This is not a reliable method because vibrations which may occur during the period of delay are left out of consideration. In actual fact the method results in an arbitrary value being reported, which occurs in the course of the oscillation.

OBJECT OF THE INVENTION

It is an object of the present invention to provide a method of digitally reporting steady state conditions by ascertaining with certainty whether the measured value has reached a steady permanent value and by not reporting the measured value until this is the case.

SUMMARY OF THE INVENTION

The present invention provides a method of digitally verifying steady state conditions, i.e., of ascertaining when a quantity which is continuously measured and reported by a measuring instrument attains a steady value after having undergone an abrupt change, which comprises comparing three consecutive sample values (A,B,C) of which one is reported if two values each differ from each other by less than a prescribed difference, and repeating the comparison, if necessary, with fresh sample values until the difference condition is satisfied.

The present invention further provides apparatus for performing a method of digitally verifying steady state conditions, i.e., of ascertaining when a quantity which is continuously measured and reported attains a steady value after having undergone an abrupt change, the apparatus comprising digital measurement output means of a measuring instrument, memory unit means having an input and an output, comparator means having first and second inputs and an output, and reporting means, the digital measurement output means being optionally arranged for communication with the input of the memory unit means and the first input of the comparator, the output of the memory unit means being connected to the second input of the comparator, and the output of the comparator being connected to the reporting means.

The invention has particular significance in its application to electric or electronic weighing machines in which the load is balanced by an electromagnetically produced force and the current which is needed for achieving balance is a measure of the magnitude of the load. However, the invention is also applicable to weighing machines of other kinds, such as a beam balance equipped with digital indicating means. Whenever a load or a weight is placed on the balance or whenever the balance has been affected by vibrations, oscillations occur which may be mechanical oscillations of the measuring element of the balance and/or oscillations of the electrical current which is proportional to the load. It is now the aim to ascertain at what point the measured value assumes a steady state in which it ceases to fluctuate for some time, and not to report the result of the measurement until this is the case, thereby to avoid faulty results and consequent faulty control.

The invention is also applicable to instruments used for measuring other physical quantities which are subject to sudden change, and it is desired to report the results of the measurements in digital form. For example it may be important for the purpose of regulation or control quickly to change a speed, an acceleration, a temperature or some other quantity to a different value, in which case the inherent inertia of the system will always result in the generation of transient oscillations which require that the fresh measured value shall not be reported until these oscillations have decayed. Nevertheless the invention will be hereinafter more particularly described with reference to the illustrative example of an electrical balance.

The result of a measurement is not reported in carrying out a method according to the invention until, after one or more trails, three consecutively measured values differ by less than a prescribed difference. For instance, if at some time after a fresh load had been placed on the scale a vibration occurs before the measured value has been reported, then the apparatus will continue to wait until the digital measurement of the weight has again settled down to a steady state, no report being released before this is the case either for display or for transmission to a data processing system.

The oscillatory phenomena which occur in different balances or measuring instruments may have widely different time constants. A desirable further feature of the invention is therefore the free selectability of the time which elapses between the taking of two samples values that are to be compared. By an appropriate choice of this period it is possible to prevent for example samples taken at corresponding points of consecutive oscillatory cycles, for instance at their peak values or at given points between their peak values and their passage through zero from simulating the presence of steady-state conditions within the prescribed difference. If the period elapsing between two sampling times is so chosen that it is shorter than one cycle of the oscillation, then such an error cannot occur.

BRIEF DESCRIPTION OF THE DRAWINGS

The drawing is a schematic representation of an apparatus and associated measuring instrument for digitally varifying steady state conditions.

DESCRIPTION OF THE SPECIFIC EMBODIMENT

An electronic balance has a digital read-out 1 embracing five decades of which the lowest is indicated by $10^0$ and the highest by $10^4$. The values measured in the three lowest decades are applied either through a line 3 to a memory unit 5 or through a line 7 to a comparator 9.

There is further provided a sequence control unit 11 consisting of eight flip-flop stages forming a ring. Such arrangements are know as ring counters. A clock pulse generator 12 triggers the unit. The signal appearing in each output initiates one of the logic functions that will be hereinafter described. The sequence control unit 11 ensures that, first a measured sample value is transmitted to the memory unit 5 through the line 3 and that after a period of delay which can be chosen by means of a delay selector 13 on the sequence control unit, a second measured sample value is transmitted through the line 7 to the comparator 9. At the same time the value retained in the memory unit 5 is also applied to the comparator through a line 15.

The comparator ascertains whether the value A from the memory unit 5 and the value B received through line 7 are equal or differ by more or less than a given number of digits. The comparator can thus ascertain for instance whether any one of the following conditions is satisfied:

$B = A$
$B = A - 1$
$B = A + 1$

This therefore corresponds to a prescribed maximum difference of ± 1 digit. If one of these conditions is satisfied the measured value A is retained in the memory unit 5, but the measured value B in the comparator is erased. At the end of a further period of delay the next sample value which may be referred to as C is transmitted to the comparator 9 and compared with sample A. The comparator now ascertains whether one of the conditions $C = A$
$C = A - 1$
$C = A + 1$ is satisfied. Should this be the case the value A or C is transferred through a line 17 from the comparator to a memory unit 19 and this value is reported via an output switch unit 21. However, if none of the latter set of conditions is satisfied, then both values A and C are erased and the cycle begins afresh. The sample values A and B are already erased if the first mentioned conditions are not satisfied.

The sampling cycle continues to be repeated with fresh measurement samples until one of the above mentioned conditions for the measured value B and then one of the conditions for the measured value C have been satisfied. Not until this is the case is the result of the measurement reported.

The sequence control unit 11 controls the transmission of the sample values to the two memory units and the comparator. It is sufficient to take samples only of the three lowest decades, and the values of the higher decades can be directly applied by the switching unit 21 to the system output, provided these higher decimal digits are not expected to be involved in the oscillations. Otherwise these higher digits may also be sent to the memory units and the comparator.

The starting signal for the initiation of the first cycle is applied to the sequence control unit by a switch 23. This can be operated by hand or by the automatic batch feeder of a weighing machine at a predetermined time after the load has been deposited.

The switch unit 21 which reports the final measurement value can deliver a special steady-state signal and during the comparison processes can provide a dark display which lights up when the comparison processes end.

We claim:

1. A method of digitally verifying steady state conditions, i.e., of ascertaining when a quantity which is continuously measured and reported by a measuring instrument attains a steady value after having undergone an abrupt change, which comprises comparing three consecutive sample values (A,B,C) of which one is reported if two values differ from each other by less than a prescribed difference, and repeating the comparison, if necessary, with fresh sample values until the difference condition is satisfied.

2. A method according to claim 1 comprising comparing the first sample value (A) with the second sample value (B), storing one of these values if the difference is less than the prescribed difference, and then comparing a third (C) sample with the stored value and reporting one of the sample values if the difference is again less than the prescribed difference.

3. A method according to claim 1 wherein the time between two sample values that are compared is optionally adjustable.

4. A method according to claim 1 wherein the reporting output is blocked until the comparison conditions are satisfied.

5. Apparatus for performing a method of digitally verifying steady state conditions, i.e., of ascertaining when a quantity which is continuously measured and reported attains a steady value after having undergone an abrupt change, the apparatus comprising digital measurement output means of a measuring instrument, memory unit means having an input and an output, comparator means having first and second inputs and an output, and reporting means, the digital measurement output means being arranged for communication with the input of the memory unit means and the first input of the comparator, the output of the memory unit means being connected to the second input of the comparator, and the output of the comparator being connected to the reporting means.

6. Apparatus according to claim 5 wherein a sequence control or programme control unit is connected to the digital measurement means, the memory unit means, the comparator means, and the reporting means.

7. An apparatus as claimed in claim 5 wherein said measuring instrument comprises a weighing machine or balance provided with said digital measurement output means.

* * * * *